(12) United States Patent
Sue et al.

(10) Patent No.: US 11,409,124 B2
(45) Date of Patent: Aug. 9, 2022

(54) OPTICAL MODULE HAVING IMAGE SHAKE CORRECTION FUNCTION

(71) Applicant: NIDEC SANKYO CORPORATION, Nagano (JP)

(72) Inventors: Takeshi Sue, Nagano (JP); Tadashi Takeda, Nagano (JP); Shinji Minamisawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 456 days.

(21) Appl. No.: 16/668,552

(22) Filed: Oct. 30, 2019

(65) Prior Publication Data
US 2021/0041714 A1 Feb. 11, 2021

(30) Foreign Application Priority Data
Aug. 9, 2019 (JP) .............................. JP2019-147315

(51) Int. Cl.
| | | |
|---|---|---|
| *G02B 27/64* | (2006.01) | |
| *G02B 7/182* | (2021.01) | |
| *H04N 5/232* | (2006.01) | |
| *H04N 5/225* | (2006.01) | |

(52) U.S. Cl.
CPC ......... *G02B 27/646* (2013.01); *G02B 7/1828* (2013.01); *H04N 5/2253* (2013.01); *H04N 5/23264* (2013.01)

(58) Field of Classification Search
CPC .. G02B 27/646; G02B 7/1828; H04N 5/2253; H04N 5/23264
USPC ....................................................... 359/554
See application file for complete search history.

(56) References Cited

U.S. PATENT DOCUMENTS

2010/0091120 A1* 4/2010 Nagata ................. H04N 5/2257
359/557

FOREIGN PATENT DOCUMENTS

JP           2011203476 A     10/2011

* cited by examiner

*Primary Examiner* — Marin Pichler
*Assistant Examiner* — Mitchell T Oestreich
(74) *Attorney, Agent, or Firm* — Cantor Colburn LLP

(57) ABSTRACT

A movable unit of an optical module having an image shake correction function is supported by a gimbal mechanism so as to be rotatable around a first axis R1 and a second axis R2. The movable body is driven by a shake-correction magnetic drive mechanism including magnets and fixed to the movable body. The movable body further includes a lens-moving magnetic drive mechanism to move a lens module in an optical axis direction. The lens-moving magnetic drive mechanism includes a lens-moving coil fixed to the lens module 7 and a lens-moving magnet disposed radially outward of the lens-moving coil. The magnets and also serve as the lens-moving magnet and are disposed radially outward of a triaxial intersection.

13 Claims, 11 Drawing Sheets

OPTICAL MODULE HAVING IMAGE SHAKE CORRECTION FUNCTION

CROSS REFERENCE TO RELATED APPLICATION

The present application claims priority under 35 U.S.C. § 119 to Japanese Patent Application No. 2019-147315 filed Aug. 9, 2019, the entire content of which is incorporated herein by reference.

FIELD OF THE INVENTION

At least an embodiment of the present invention relates to an optical module having an image shake correction function for correcting the shake of the optical module.

BACKGROUND

There have been optical modules installed in portable terminals and mobile devices are provided with mechanisms including a movable body equipped with lenses to be movably shifted or rotated to correct shake, in order to suppress disturbance of an image captured when the portable terminal or the mobile device is moving. Japanese Unexamined Patent Publication No. 2011-203476 discloses an optical module having such an image shake correction function.

The optical module having an image shake correction function described in Japanese Unexamined Patent Publication No. 2011-203476 (JP 2011-203476 A) includes a movable body equipped with a lens, a support body that supports the movable body in a movably shiftable manner, and a shake-correction magnetic drive mechanism that movably shifts the movable body. The support body includes a fulcrum protrusion member that abuts the movable body from a non-subject side, and a frame-shaped case that is positioned on the outer periphery of the movable body. The shake-correction magnetic drive mechanism includes a shake-correction magnet that is fixed to the movable body and a shake-correction coil fixed to the case and facing the shake-correction magnet. The shake-correction magnet and the shake-correction coil are disposed closer to the target than the fulcrum protrusion. The movable body movably shifts about the fulcrum at the tip of the fulcrum protrusion by feeding electrical power to the shake-correction coil.

The movable body includes a lens module including a lens, a holder that holds the lens module in a movable manner in the optical axis direction, and a lens-moving magnetic drive mechanism that moves the lens module in the direction along the optical axis. The holder has a frame shape and surrounds the outer periphery of the lens module. The lens-moving magnetic drive mechanism is disposed closer to the target than the fulcrum. The lens-moving magnetic drive mechanism includes a lens-moving coil fixed to the lens module and a lens-moving magnet that is fixed to the holder and facing the lens-moving coil. The lens module moves in the optical axis direction by feeding power to the lens-moving coil. In JP 2011-203476 A, the lens-moving magnetic drive mechanism and the shake-correction magnetic drive mechanism are arranged in the radial direction, and the shake-correction magnet also serves as the lens-moving magnet.

The recent size reduction in the apparatuses equipped with such an optical module requires a further size reduction in the optical module having the image shake correction function.

In Japanese laid-open patent application JP 2011-203476 A, the shake-correction magnet of the shake-correction magnetic drive mechanism also serves as the lens-moving magnet of the lens-moving magnetic drive mechanism. Thus, it is possible to reduce the dimension of the optical module having the image shake correction function in the radial direction in comparison with a case where the optical module separately including the lens-moving magnet and the shake-correction magnet in such a manner that the shake-correction magnet is disposed around the outer periphery of the lens-moving magnet. However, in JP 2011-203476 A, it is necessary to provide a fulcrum protrusion on a non-subject side, to support the movable body in the movably shiftable manner. The fulcrum projection and the movable body are arranged in the optical axis direction. Thus, it is difficult to downsize the optical module having an image shake correction function in the optical axis direction.

An object of at least an embodiment of the present invention, in view of such issues described above, is to provide an optical module having an image shake correction function that readily allows downsizing in the radial direction of the optical axis and the optical axis direction.

SUMMARY

To solve the above-described issues, an optical module having an image shake correction function according to at least an embodiment of the present invention includes a movable body including a lens; a gimbal mechanism that supports the movable body in rotatable manner around a first axis intersecting an optical axis of the lens and a second axis intersecting the optical axis and the first axis; a fixed body that supports the movable body via the gimbal mechanism; and a shake-correction magnetic drive mechanism that rotates the movable body around the first axis and the second axis, where the movable body includes a lens module including the lens, a holder that has a frame shape and supports the lens module on the outer peripheral side of the lens module so that the lens module is movable in the optical axis direction, and a lens-moving magnetic drive mechanism that moves the lens module along the optical axis direction, the gimbal mechanism includes a gimbal frame, a first coupling mechanism that couples the gimbal frame and the holder in a rotatable manner around the first axis, and a second coupling mechanism that couples the gimbal frame and the fixed body in a rotatable manner around the second axis, the fixed body includes a frame that surrounds the holder and the gimbal frame from an outer peripheral side, the shake-correction magnetic drive mechanism includes a shake-correction magnet that is fixed to the holder; and a shake-correction coil that is fixed to the frame and faces the shake-correction magnet, the lens-moving magnetic drive mechanism includes a lens-moving coil that is fixed to the lens module; and a lens-moving magnet that is fixed to the holder and faces the lens-moving coil, the shake-correction magnet also serves as the lens-moving magnet, and the lens-moving coil, the shake-correction magnet, and the shake-correction coil are disposed in this order along a radially outward direction of the optical axis from a triaxial intersection of the optical axis, the first axis, and the second axis.

According to at least an embodiment of the present invention, the movable body is supported by the gimbal mechanism so as to be rotatable around the first axis and the second axis. The lens-moving coil and the shake-correction magnet of the movable body are disposed radially outward of the triaxial intersection of the optical axis, the first axis, and the second axis. The triaxial intersection is a movably-shifting center point of the movable body when the movable body is tilted relative to the optical axis. Thus, the movably-shifting center point of the movable body is disposed at an inward position on the movable body in the optical axis direction. This eliminates the need to place a swingable support member on the outside of the movable body in the optical axis direction, so the optical module having an image shake correction function can be downsized in the optical axis direction. The shake-correction magnet of the shake-correction magnetic drive mechanism that rotates the movable body also serves as the lens-moving magnet of the lens-moving magnetic drive mechanism that moves the lens. The lens-moving coil, the shake-correction magnet, and the shake-correction coil are disposed in this order from the triaxial intersection along the radially outward direction of the optical axis. Thus, it is possible to reduce the dimension of the optical module having the image shake correction function in the radial direction of the optical axis in comparison with a case where an optical module separately including a lens-moving magnet and a shake-correction magnet in such a manner that the shake-correction magnet is disposed radially outward of the lens-moving magnet. The movably-shifting center point of the movable body is disposed at an inward position on the movable body along the optical axis direction. Thus, the space needed for the displacement of the movable body when the movable body is to be movably shifted by a predetermined angle relative to the optical axis can be reduced in comparison with the case where the movably-shifting center point of the movable body is disposed outward of the movable body. This allows the movable body and the frame of the fixed body can be brought close to each other in the radial direction of the optical axis. Thus, the optical module having the image shake correction function can be downsized in the radial direction perpendicular to the optical axis. The movable body and the frame of the fixed body can be brought close together in the radial direction. Thus, even when the shake-correction magnet is brought close to the lens-moving coil in the radial direction so as to serve as the lens-moving magnet, the shake-correction coil fixed to the frame and the shake-correction magnet can be prevented from moving apart from each other.

According to at least an embodiment of the present invention, the first axis may be perpendicular to the optical axis, and the second axis may be perpendicular to the optical axis and the second axis. In this way, the optical module having an image shake correction function can be readily downsized in the optical axis direction.

According to at least an embodiment of the present invention, the holder may have a magnet holding hole penetrating the holder in a direction intersecting the optical axis, and the shake-correction magnet may pass through the magnet holding hole to face the lens-moving coil and the shake-correction coil. In this way, the inner peripheral face of the shake-correction magnet held by the holder can be faced to the lens-moving coil, and the outer peripheral face can be faced to the shake-correction coil.

According to at least an embodiment of the present invention, the first coupling mechanism may include a pair of first support members that are fixed at corners of the holder along the first axis and protrude from the holder to the outer peripheral side along the first axis, and a pair of first concave curved surfaces that are disposed on the gimbal frame and in contact with tips of the pair of first support members. The second coupling mechanism may include a pair of second support members that are fixed at corners of the frame along the second axis and protrude from the frame to the inner peripheral side along the second axis, and a pair of second concave curved surfaces that are disposed on the gimbal frame and in contact with tips of the pair of second support members. In this way, the movable body can be supported by the gimbal mechanism so as to be rotatable around the first axis and the second axis.

According to at least an embodiment of the present invention, the gimbal frame may include a gimbal frame body that has an opening through which the lens module passes; a pair of first gimbal frame extensions that protrude from both sides of the gimbal frame body in the first axis direction and extend along the optical axis direction between the frame and the holder; and a pair of second gimbal frame extensions that protrude from both sides of the gimbal frame body in the second axis direction and extend along the optical axis direction between the frame and the holder, the first concave curved surfaces may be disposed respectively on the pair of first gimbal frame extensions, and the second concave curved surfaces may be disposed respectively on the pair of second gimbal frame extensions. In this way, the first coupling mechanism and the second coupling mechanism may be disposed radially outward of the movable body. Thus, the triaxial intersection of the optical axis, the first axis, and the second axis may be disposed at a position on the inner side of the movable body in the optical axis direction.

According to at least an embodiment of the present invention, the shake-correction magnetic drive mechanism may include a first shake-correction magnetic drive mechanism disposed between the first axis and the second axis along a peripheral direction around the optical axis; and a second shake-correction magnetic drive mechanism disposed between the first axis and the second axis from the opposite side of the first shake-correction magnetic drive mechanism relative to the first axis in the peripheral direction. The shake-correction magnet may include a first magnet of the first shake-correction magnetic drive mechanism; and a second magnet of the second shake-correction magnetic drive mechanism. The lens-moving coil may include a first lens-moving coil that is wound around the optical axis along the outer peripheral surface of the lens module and faces the first magnet and the second magnet; and a second lens-moving coil that is wound around the optical axis along the outer peripheral surface of the lens module adjacent to the first lens-moving coils in the optical axis direction, and faces the first magnet and the second magnet. In this way, the lens module may be moved in the optical axis direction by feeding power to the first lens-moving coil and the second lens-moving coil.

According to at least an embodiment of the present invention, the shake-correction magnetic drive mechanism may include a first shake-correction magnetic drive mechanism disposed between the first axis and the second axis along a peripheral direction around the optical axis; and a second shake-correction magnetic drive mechanism disposed between the first axis and the second axis and disposed adjacent to the first axis and remote from the first shake-correction magnetic drive mechanism in the peripheral direction. The shake-correction magnet may include a first magnet of the first shake-correction magnetic drive mechanism; and a second magnet of the second shake-correction magnetic drive mechanism. The lens-moving coil may include a first lens-moving coil that is fixed to the outer peripheral surface of the lens module with a center hole of the first lens-moving coil oriented in the radial direction of the optical axis, and faces the first magnet; and a second lens-moving coil that is fixed to the outer peripheral surface of the lens module with a center hole of the second lens-moving coil oriented in the radial direction of the optical axis, and faces the second magnet. In this way, the lens module may be moved in the optical axis direction by feeding power to the first lens-moving coil and the second lens-moving coil.

According to at least an embodiment of the present invention, the shake-correction magnetic drive mechanism may include a first shake-correction magnetic drive mechanism disposed between the first axis and the second axis along a peripheral direction around the optical axis; and a second shake-correction magnetic drive mechanism that is disposed between the first axis and the second axis on the opposite side of the first shake-correction magnetic drive mechanism with respect to the first axis in the peripheral direction. The shake-correction magnet may include a first magnet of the first shake-correction magnetic drive mechanism; and a second magnet of the second shake-correction magnetic drive mechanism. The lens-moving coil may be fixed to the outer peripheral surface of the lens module with a center hole being oriented in the radial direction of the optical axis, and faces one of the first magnet and the second magnet. In this way, the lens module may move in the optical axis direction by feeding power to the first lens-moving coil.

According to at least an embodiment of the present invention, the shake-correction coil may include a first coil of the first shake-correction magnetic drive mechanism; and a second coil of the second shake-correction magnetic drive mechanism. The fixed body may include a first magnetic member that is disposed on the opposite side of the movable body with respect to the first coil in the radial direction of the optical axis; and a second magnetic member that is disposed on the opposite side of the movable body of the second coil. In this way, when power is not fed to the shake-correction coil, the movable body can maintain a predetermined orientation by a pulling force between the first magnetic member and the first magnet and a pulling force between the second magnetic member and the second magnet. In other words, when the shake-correction magnetic drive mechanism is not being driven, the orientation of the movable body can be maintained at a predetermined orientation.

According to at least an embodiment of the present invention, the movable body may be supported by the gimbal mechanism so as to be movably shiftable around a movably-shifting center point (triaxial intersection) disposed on the inner side the movable body in the optical axis direction. This eliminates the need to arrange members that support the movable body in the optical axis direction of the movable body. Thus, the optical module having an image shake correction function can be downsized in the optical axis direction. The shake-correction magnet of the shake-correction magnetic drive mechanism that rotates the movable body also serves as the lens-moving magnet of the lens-moving magnetic drive mechanism that moves the lens. This eliminates the need to arrange the shake-correction magnet and the lens-moving magnet in the radial direction of the optical axis. Thus, the optical module having an image shake correction function can be downsized in the radial direction. The movably-shifting center point of the movable body is disposed at an inward position on the movable body along the optical axis direction. Thus, the space needed for the displacement of the movable body when the movable body is to be movably shifted by a predetermined angle relative to the optical axis can be reduced in comparison with the case where the movably-shifting center point of the movable body is disposed outward of the movable body. The closely disposed movable body and the frame of the fixed body prevents the shake-correction coil fixed to the frame and the shake-correction magnet from moving apart from each other, even when the shake-correction magnet moves close to the lens-moving coil in the radial direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
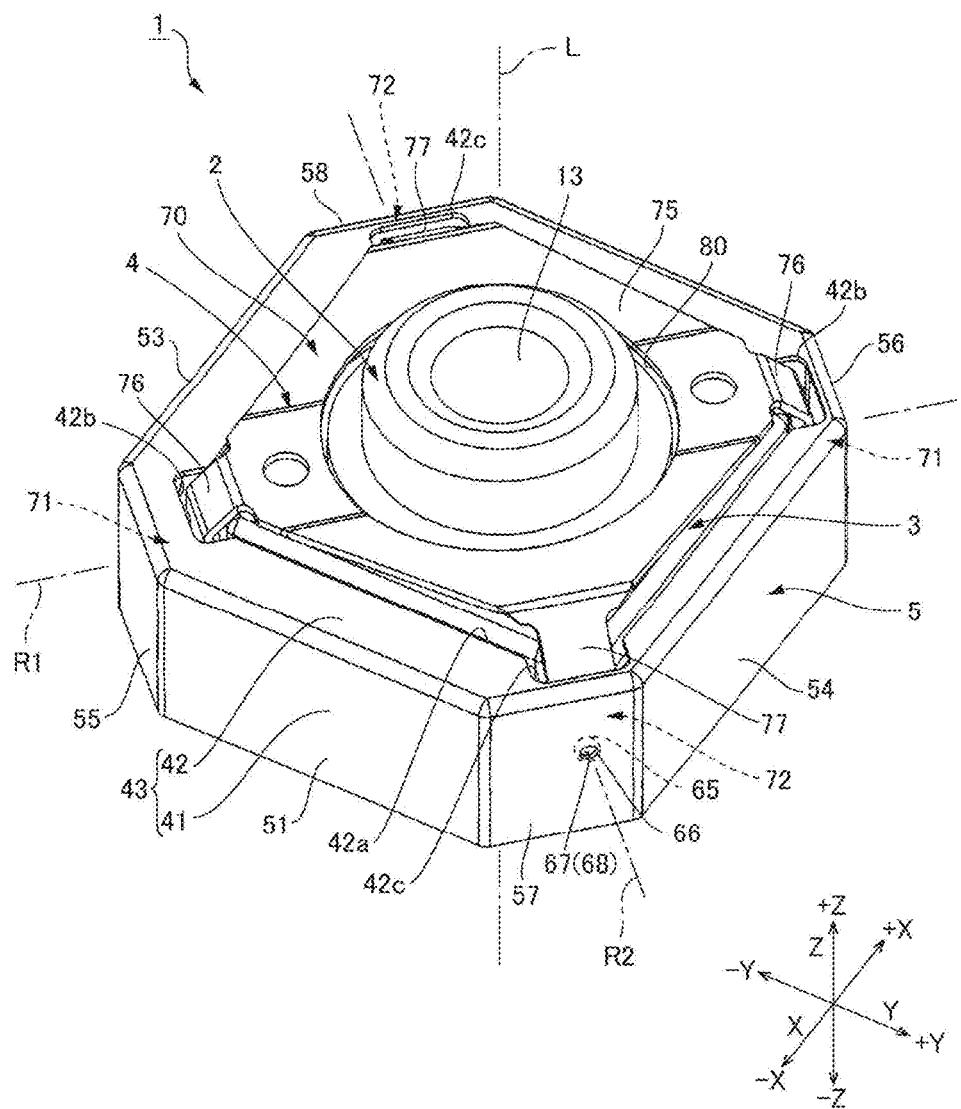
FIG. 1 is a perspective view of an optical module having an image shake correction function.

Embodiments will now be described, by way of example only, with reference to the accompanying drawings which are meant to be exemplary, not limiting, and wherein like elements are numbered alike in the drawings.

An optical module having an image shake correction function according to at least an embodiment of the present invention will now be described with reference to the accompanying drawings.

Figure 2:
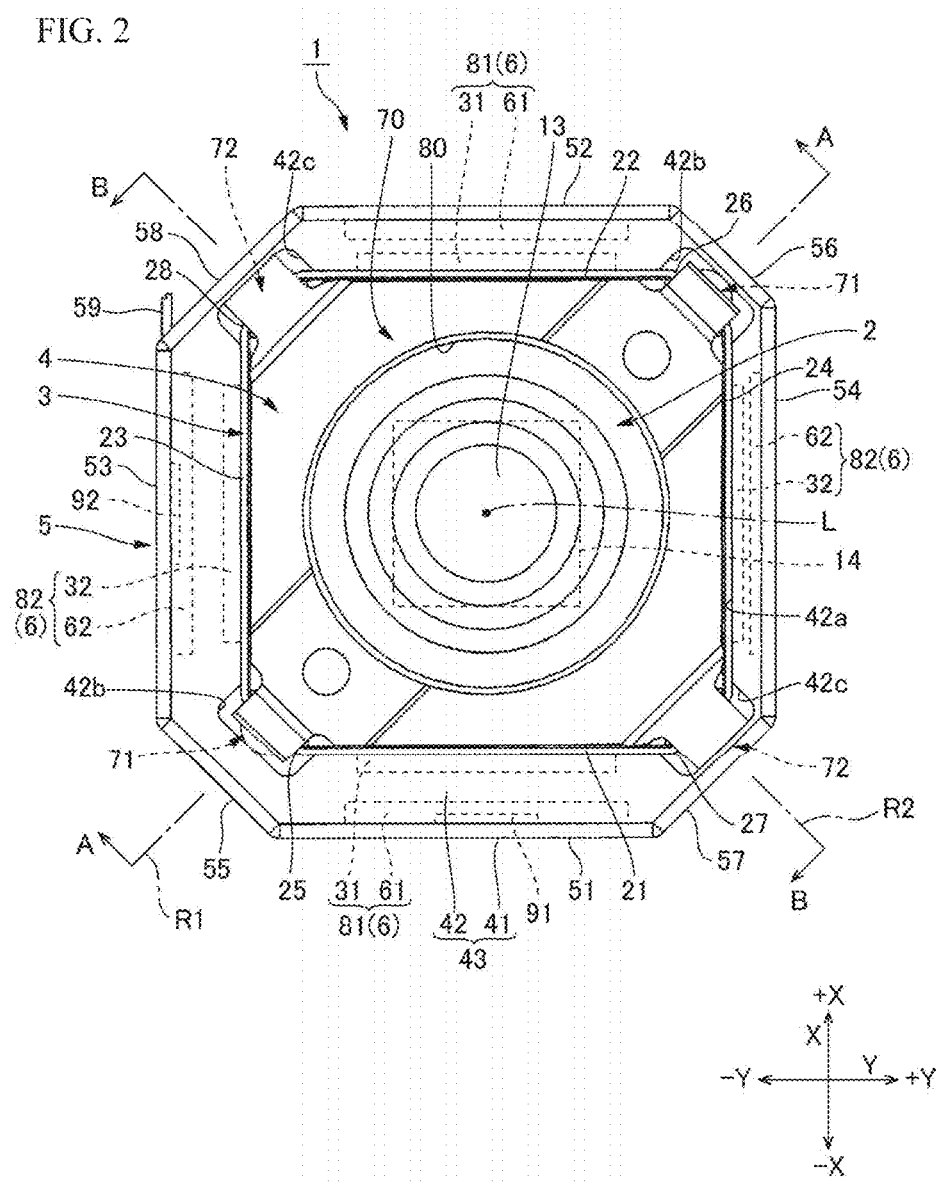
FIG. 2 is a plan view of the optical module having the image shake correction function illustrated in FIG. 1 as viewed from the optical axis direction.
Figure 3:
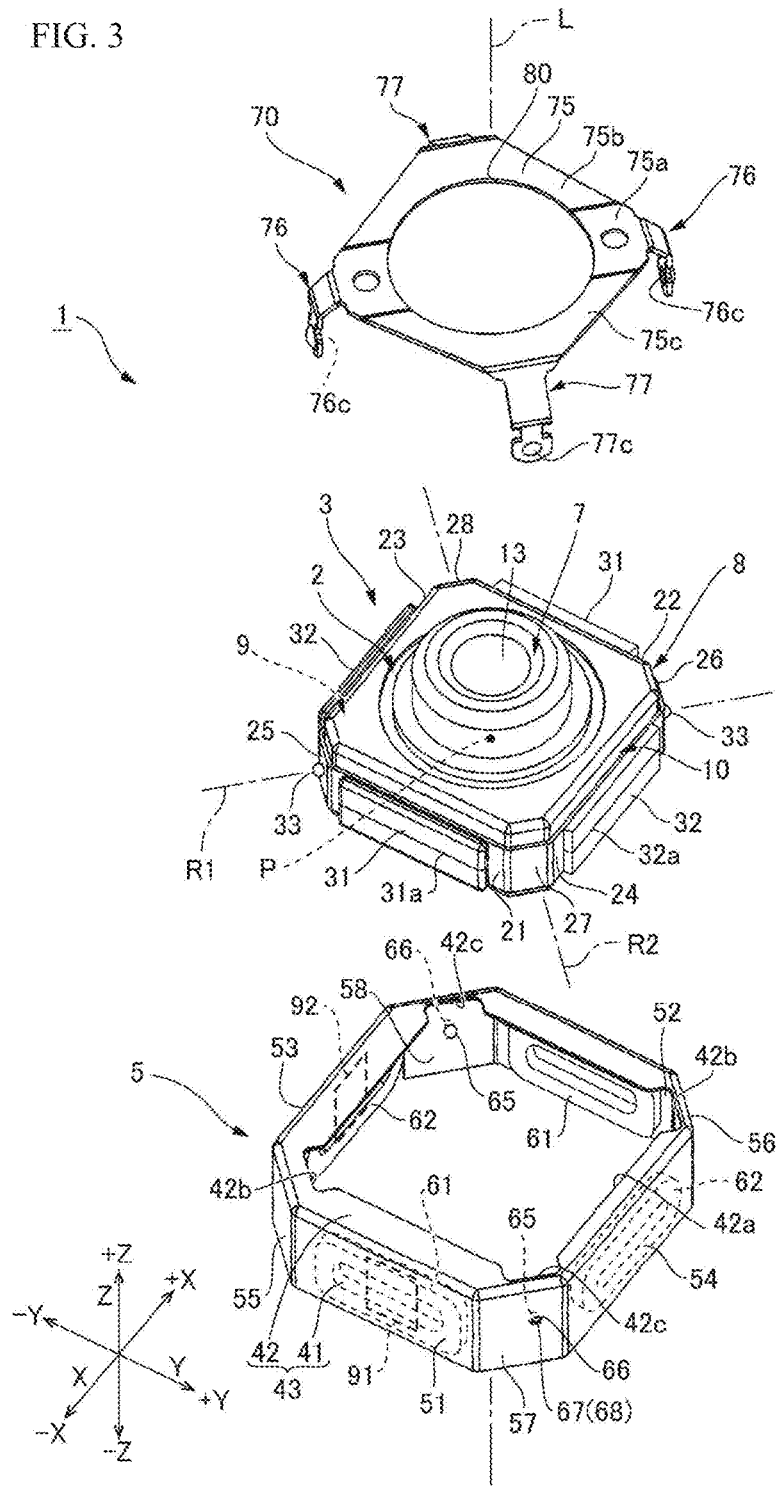
FIG. 3 is an exploded perspective view of the optical module having the image shake correction function illustrated in FIG. 1.

FIG. 1 is a perspective view of an optical module having the image shake correction function. FIG. 2 is a plan view of the optical module having the image shake correction function illustrated in FIG. 1 as viewed from the optical axis direction. FIG. 3 is an exploded perspective view of the optical module having the image shake correction function illustrated in FIG. 1.

The optical module 1 having an image shake correction function is equipped with a camera module 2. The optical module 1 having the image shake correction function is used in optical devices, such as mobile phones having cameras, drive recorders, and other optical devices, such as action cameras and wearable cameras mounted on helmets, bicycles, a movable object such as a radio-controlled helicopter, etc. In such an optical device, shaking of the optical device during image capturing causes disturbance in the captured image. The optical module 1 having the image shake correction function corrects the tilt of the camera module 2 on the basis of the acceleration, angular velocity, and shake amount, etc., detected by a detector, such as a gyroscope, to prevent tilting of the captured image.

In the following description, the three axes perpendicular to each other are defined as the X axis, the Y axis, and the Z axis. One direction along the X axis direction is defined as the +X direction and the other direction as the −X direction. One direction along the Y axis direction is defined as the +Y direction and the other direction as the −Y direction. One direction along the Z axis direction is defined as the +Z direction and the other direction as the −Z direction. The Z axis coincides with the optical axis L of the camera module 2. The +Z direction is the direction toward the target side, and the −Z direction is the direction toward the non-subject side.

As illustrated in FIG. 1 to FIG. 3, the optical module 1 having the image shake correction function includes a movable body 3 having a camera module 2, a gimbal mechanism 4 that supports the movable body 3 in a movably-shiftable manner, a fixed body 5 that supports the movable body 3 via the gimbal mechanism 4, and a shake-correction magnetic drive mechanism 6 that movably shifts the movable body 3 relative to the fixed body 5. The gimbal mechanism 4 supports the movable body 3 in a rotatable manner around a first axis R1 perpendicular to the optical axis L and a second axis R2 perpendicular to the optical axis L and the first axis R1. The first axis R1 and the second axis R2 are inclined tilt by 45 degrees around the optical axis L relative to the X and Y axes.

The optical module 1 having the image shake correction function movably shifts the movable body 3 around the first axis R1 and the second axis R2. The optical module 1 having the image shake correction function movably shifts the movable body 3 around the X and Y axes by combining the rotations around the first axis R1 and the second axis R2.

Movable Body

Figure 4:
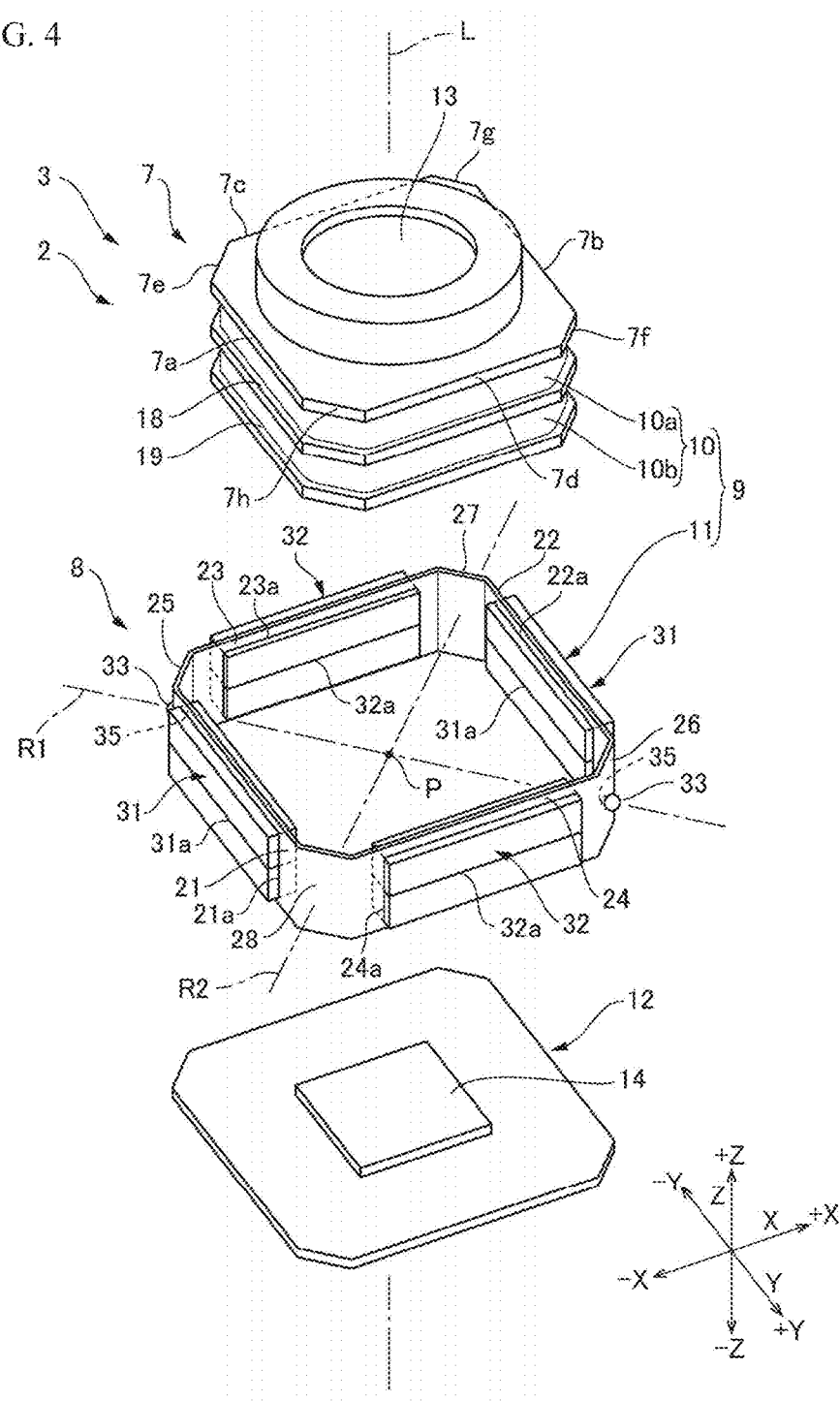
FIG. 4 is an exploded perspective view of a movable body.
Figure 5:
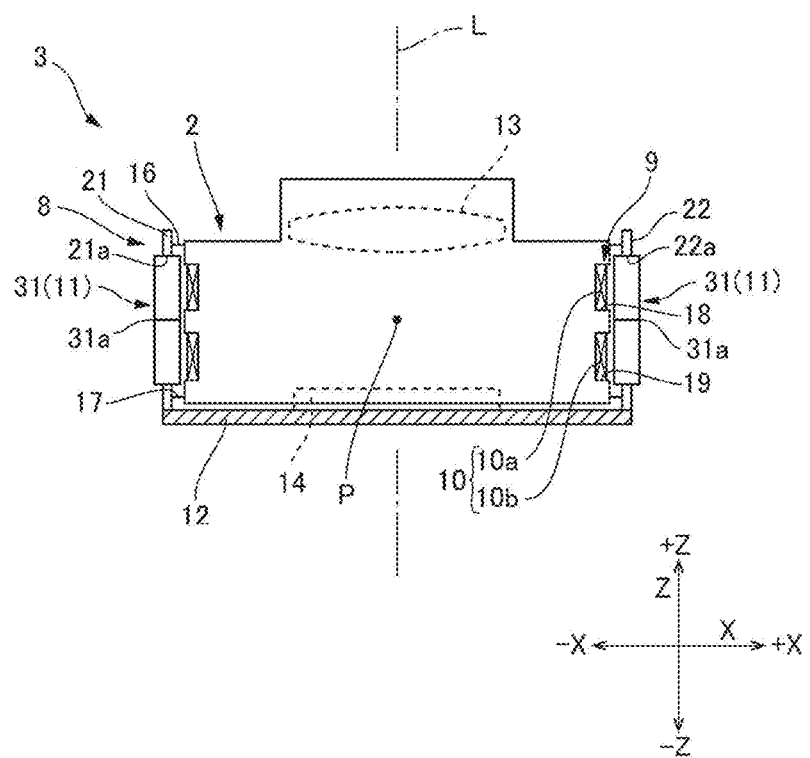
FIG. 5 is a schematic cross-sectional view of the movable body taken along the X axis.

FIG. 4 is an exploded perspective view of the movable body 3. FIG. 5 is a schematic cross-sectional view of the movable body 3 taken along the X axis. In FIG. 4, the two flat springs extended across the lens module and the holder are omitted.

As illustrated in FIG. 3, the movable body 3 includes a lens module 7 including a lens 13, a frame-shaped holder 8 that supports the lens module 7 in a movable manner in the Z axis direction around the outer periphery of the lens module 7, and a lens-moving magnetic drive mechanism 9 that moves the lens module 7 along the Z direction. The lens-moving magnetic drive mechanism 9 includes lens-moving coils 10 fixed to the lens module 7, and a lens-moving magnets 11 fixed to the holder 8 and facing the lens-moving coils 10. The movable body 3 includes a board 12 disposed on the −Z direction side of the lens module 7, as illustrated in FIG. 4. An imaging device 14 is mounted on the board 12. The lens module 7, the holder 8, the lens-moving magnetic drive mechanism 9, the board 12, and the imaging device 14 constitute the camera module 2. The optical axis L of the camera module 2 is the optical axis L of the lens 13. The imaging device 14 is disposed on the optical axis L. The camera module 2 has an octagonal shape in view from the Z axis. The movable body 3 further includes a pair of first spherical bodies 33 fixed to the holder 8.

The holder 8 is made of metal. The holder 8 is composed of non-magnetic material. The holder 8 has an octagonal shape in view of the Z axis. As illustrated in FIG. 4, the holder 8 includes a first side plate 21 and a second side plate 22 that extend parallel to the Y direction, and a third side plate 23 and a fourth side plate 24 that extend parallel to the X direction. The first side plate 21 is disposed on the −X direction side of the second side plate 22. The third side plate 23 is disposed on the −Y direction side of the fourth side plate 24. The holder 8 includes a fifth side plate 25 that connects the first side plate 21 and the third side plate 23, and a sixth side plate 26 that connects the second side plate 22 and the fourth side plate 24, at opposing corners along the first axis R1 direction. The holder 8 includes a seventh side plate 27 that connects the first side plate 21 and the fourth side plate 24, and an eighth side plate 28 that connects the second side plate 22 and the third side plate 23, at opposing corners along the second axis R2 direction.

The first side plate 21 has a first magnet holding hole 21a extending through the first side plate 21 in the X axis direction. The second side plate 22 has a second magnet holding hole 22a extending through the second side plate 22 in the X axis direction. The third side plate 23 has a third magnet holding hole 23a extending through the third side plate 23 in the Y axis direction. The fourth side plate 24 has a fourth magnet holding hole 24a extending through the fourth side plate 24 in the Y axis direction. A pair of first magnets 31 pass through the first magnet holding hole 21a and the second magnet holding hole 22a. A pair of second magnets 32 pass through the third magnet holding hole 23a and the fourth magnet holding hole 24a.

Each of the pair of the first magnets 31 is divided into two parts in the Z axis direction. Thus, the magnetic polarization line 31a of each first magnet 31 extends in the peripheral direction. The magnetic pole on the inner peripheral surface of the divided part on the +Z direction side of each first magnet 31 is different from the magnetic pole on the outer peripheral surface. The magnetic pole on the inner peripheral surface of the divided parts on the −Z direction side of each first magnet 31 is different from the magnetic pole on the outer peripheral surface. The pair of the first magnets 31 have the same magnetic poles facing each other in the X axis direction. In other words, the magnetic pole on the inner peripheral surface of the divided part on the +Z direction side of one of the first magnets 31 is the same as the magnetic pole on the inner peripheral surface of the divided part on the +Z direction side of the other first magnet 31. The magnetic pole on the inner peripheral surface of the divided part on the −Z direction side of one of the first magnets 31 is the same as the magnetic pole on the inner peripheral surface of the divided part on the −Z direction side of the other first magnet 31.

Each of the pair of the second magnet 32 is divided into two parts in the Z axis direction. Thus, the magnetic polarization line 32a of each second magnet 32 extends in the peripheral direction. The magnetic pole on the inner peripheral surface of the divided part on the +Z direction side of each second magnets 32 is different from the magnetic pole on the outer peripheral surface. The magnetic pole on the inner peripheral surface of the divided parts on the −Z direction side of each second magnets 32 is different from the magnetic pole on the outer peripheral surface. The pair of the second magnets 32 have the same magnetic poles facing each other in the Y axis direction. In other words, the magnetic pole on the inner peripheral surface of the divided part on the +Z direction side of one of the second magnets 32 is the same as the magnetic pole on the inner peripheral surface of the divided part on the +Z direction side of the other second magnet 32. The magnetic pole on the inner peripheral surface of the divided part on the −Z direction side of one of the second magnets 32 is the same as the magnetic pole on the inner peripheral surface of the divided part on the −Z direction side of the other second magnet 32.

The magnetic pole on the inner peripheral surfaces of the divided parts on the +Z direction side of each first magnets 31 is the same as the magnetic pole on the inner peripheral surfaces of the divided parts on the +Z direction side of each second magnets 32. Thus, the magnetic pole on the inner peripheral surfaces of the divided parts on the −Z direction side of each first magnets 31 is the same as the magnetic pole on the inner peripheral surfaces of the divided parts on the −Z direction side of each second magnets 32.

First spherical bodies 33 (first support members) are fixed to the fifth side plate 25 and the sixth side plate 26 of the holder 8. The first spherical bodies 33 are made of metal. The first spherical body 33 fixed to the fifth side plate 25 projects from the holder 8 on the first axis R1 to the outer peripheral side. The first spherical body 33 fixed to the sixth side plate 26 projects from the holder 8 on the first axis R1 to the outer peripheral side. The first spherical bodies 33 are fixed to the holder 8 by welding.

In specific, the fifth side plate 25 and the sixth side plate 26 have first through holes 35 through which the first axis R1 passes. The first through holes 35 has a smaller diameter than the outer diameter of the first spherical bodies 33. The first spherical body 33 is welded to the fifth side plate 25 while being partially inserted into the first through hole 35 from the outer peripheral side of the fifth side plate 25. Also, the first spherical body 33 is welded to the sixth side plate 26 while being partially inserted into the corresponding first through hole 35 from the outer peripheral side of the sixth side plate 26.

Besides the first spherical bodies 33, metal shafts may be used. In such a case, each shaft can extend through the corresponding first through hole 35 on the first axis R1. The shafts protrude from the fifth side plate 25 and the sixth side plate 26 to the outer peripheral side on the first axis R1. The end portion of each shaft on the outer peripheral side has a hemispherical shape.

As illustrated in FIG. 3, the lens module 7 is disposed on the inner peripheral surface of the holder 8. As illustrated in FIG. 4, the lens module 7 has an octagonal shape in view from the Z axis. The lens module 7 inserted into the holder 8 includes a first wall 7a facing the first side plate 21 of the holder 8 with a narrow gap disposed therebetween, a second wall 7b facing the second side plate 22 of the holder 8 with a narrow gap disposed therebetween, a third wall 7c facing the third side plate 23 of the holder 8 with a narrow gap disposed therebetween, and a fourth wall 7d facing the fourth side plate 24 of the holder 8 with a narrow gap disposed therebetween. The lens module 7 further includes a fifth wall 7e facing the fifth side plate 25 of the holder 8 with a narrow gap disposed therebetween, a sixth wall 7f facing the sixth side plate 26 of the holder 8 with a narrow gap disposed therebetween, a seventh wall 7g facing the seventh side plate 27 of the holder 8 with a narrow gap disposed therebetween, and an eighth wall 7h facing the eighth side plates 28 of the holder 8 with a narrow gap disposed therebetween. The lens module 7 further includes a first coil holding groove 18 and a second coil holding groove 19 on the outer peripheral surface including the first wall 7a to the eighth wall 7h. The first coil holding groove 18 and the second coil holding groove 19 have an annular shape surrounding the optical axis L and are disposed side by side in the Z axis direction.

The first coil holding groove 18 holds a first lens-moving coil 10a. The second coil holding groove 19 holds a second lens-moving coil 10b. The first lens-moving coil 10a and the second lens-moving coil 10b are wound around the optical axis L.

When the lens module 7 is disposed on the inner peripheral side of the holder 8, the first lens-moving coil 10a and the second lens-moving coil 10b face the pair of the first magnets 31 in the radial direction with narrow gaps disposed therebetween and face the second magnets 32 in the radial direction with narrow gaps disposed therebetween. The pair of the first magnets 31, the pair of the second magnets 32, the first lens-moving coil 10a, and the second lens-moving coil 10b constitute the lens-moving magnetic drive mechanism 9. In other words, the pair of the first magnets 31 and the pair of the second magnets 32 are the lens-moving magnets 11 of the lens-moving magnetic drive mechanism 9. The first lens-moving coil 10a and the second lens-moving coil 10b are the lens-moving coils 10 of the lens-moving magnetic drive mechanism 9.

The lens-moving coils 10, the two first magnets 31, and the pair of the second magnets 32 are disposed radially outward from the triaxial intersection P of the optical axis L, the first axis R1, and second axis R2.

As illustrated in FIG. 5, the lens module 7 is supported by the holder 8 via a first flat spring 16 and a second flat spring 17 extending across the lens module 7 and the holder 8, so as to be movable in the Z axis direction. The first flat spring 16 extends across a portion of the lens module 7 on the +Z direction side and an end portion of the holder 8 on the +Z direction side. The second flat spring 17 extends across a portion of the lens module 7 on the −Z direction side and an end portion of the holder 8 on the −Z direction side. The lens module 7 moves in the Z axis direction by feeding power to the lens-moving coils 10. As a result, the lens 13 moves in the optical axis L direction. When power is fed to the lens-moving coils 10, the direction of the current in the first lens-moving coil 10a and the direction of the current in the second lens-moving coil 10b are opposite to each other around the optical axis L.

Fixed Body

Figure 6:
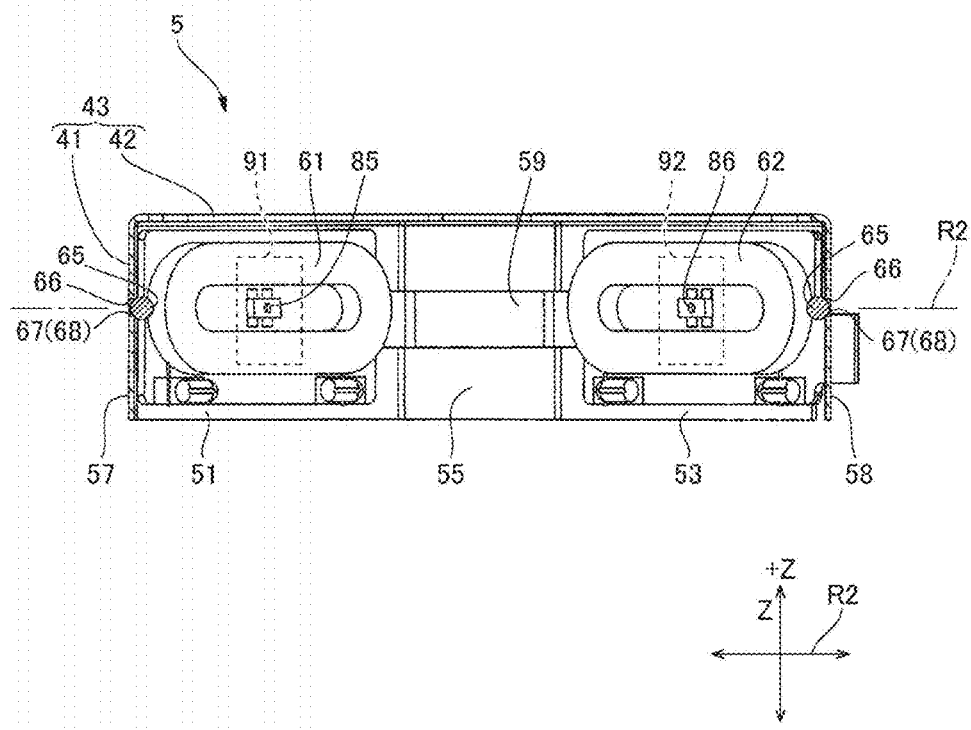
FIG. 6 is a cross-sectional view of a fixed body taken along line B-B in FIG. 2.

FIG. 6 is a cross-sectional view of the fixed body 5 taken along line B-B in FIG. 2. As illustrated in FIG. 1 and FIG. 3, the fixed body 5 includes a frame-shaped case 43 that surrounds the movable body 3. The case 43 has an octagonal shape from view of the Z axis. The case 43 has a frame 41 that surrounds the movable body 3 from the outer peripheral side, and a frame-shaped plate 42 that protrudes from the edge of the frame 41 on the +Z direction side on the inner peripheral side. The case 43 is made of metal that is a non-magnetic material.

The frame 41 has an octagonal shape from view of the Z axis. The frame 41 has a constant thickness in the direction perpendicular to the optical axis L. The frame-shaped plate 42 has a constant thickness in the Z axis direction. A rectangular opening 42a is formed at the center of the frame-shaped plate 42. The holder 8 is disposed on the inner periphery of the opening 42a. The frame-shaped plate 42 has rectangular first cutouts 42b at both corners of the opening 42a in the first axis R1 direction. The first cutouts 42b are depressed in the second axis R2 direction outward from the opening 42a. The frame-shaped plate 42 has rectangular second cutouts 42c at both corners of the opening 42a in the second axis R2 direction. The second cutouts 42c are depressed in the second axis R2 direction outward from the opening 42a.

As illustrated in FIG. 6, the frame 41 includes a first side wall 51 and a second side wall 52 that extend parallel to the Y direction, and a third side wall 53 and a fourth side wall 54 that extend parallel to the X direction. The first side wall 51 is disposed on the −X direction side of the second side wall 52. The third side wall 53 is disposed on the −Y direction side of the fourth side wall 54. The frame 41 includes a fifth side wall 55 that connects the first side wall 51 and the third side wall 53, and a sixth side wall 56 that connects the second side wall 52 and the fourth side wall 54, at opposing corners along the first axis R1 direction. The frame 41 further includes a seventh side wall 57 that connects the first side wall 51 and the fourth side wall 54, and an eighth side wall 58 that connects the second side wall 52 and the third side wall 53, at opposing corners along the second axis R2 direction.

When the fixed body 5 surrounds the movable body 3 from the outer periphery, as illustrated in FIG. 2, the first side plate 21 of the holder 8 and the first side wall 51 of the frame 41 face each other in the X axis direction with a gap disposed therebetween. The second side plate 22 of the holder 8 and the second side wall 52 face each other in the X axis direction with a gap disposed therebetween. The third side plate 23 of the holder 8 and the third side wall 53 face each other in the Y axis direction with a gap disposed therebetween. The fourth side plate 24 of the holder 8 and the fourth side wall 54 face each other in the Y axis direction with a gap disposed therebetween. The fifth side plate 25 of the holder 8 and the fifth side wall 55 face each other in the first axis R1 direction with a gap disposed therebetween. The sixth side plate 26 of the holder 8 and the sixth side wall 56 face each other in the first axis R1 direction with a gap disposed therebetween. The seventh side plate 27 of the holder 8 and the seventh side wall 57 face each other in the second axis R2 direction with a gap disposed therebetween. The eighth side plate 28 of the holder 8 and the eighth side wall 58 face each other in the second axis R2 direction with a gap disposed therebetween.

As illustrated in FIG. 6, the fixed body 5 includes a flexible printed circuit board 59 routed along the entire inner peripheral surface of the frame 41. As illustrated in FIG. 2, the fixed body 5 further includes a pair of the first shake-correction coils 61 fixed on the inner sides of the first side wall 51 and the second side wall 52 via the flexible printed circuit board 59, and a pair of second shake-correction coils 62 fixed to the inner sides of the third side wall 53 and the fourth side wall 54 via the flexible printed circuit board 59. Each first shake-correction coil 61 has their center holes oriented in the X axis direction. A first hole element 85 is fixed to the flexible printed circuit board 59 on the inner circumferential side of the center hole of the shake-correction coil 61 disposed on the inner side of the first side wall 51. A second Hall device 86 is fixed to the inner circumferential side of the center hole of the second shake-correction coil 62 disposed on the inner side of the third side wall 53.

A first magnetic member 91 is disposed on the outer circumferential side of the shake-correction coil 61 disposed on the inner side of the first side wall 51. The first magnetic member 91 is a rectangular plate member long in the Z axis direction. A second magnetic member 92 is disposed on the outer circumferential side of the second shake-correction coil 62 disposed on the inner side of the third side wall 53. The second magnetic member 92 is a rectangular plate member long in the Z axis direction. The first magnetic member 91 and the second magnetic member 92 are fixed to the inner peripheral surface of the frame 41 or on a surface of the flexible printed circuit board 59 on the opposite side of the first shake-correction coil 61 and the second shake-correction coil 62.

As illustrated in FIG. 3, second spherical bodies 65 (second support members) are fixed respectively to the seventh side wall 57 and the eighth side wall 58 of the frame 41. The second spherical bodies 65 are made of metal. The second spherical body 65 fixed to the seventh side wall 57 projects from the case 43 on the second axis R2 to the inner peripheral side. The second spherical body 65 fixed to the eighth side wall 58 projects from the case 43 on the second axis R2 to the inner peripheral side. The second spherical bodies 65 are fixed to the case 43 by welding.

In specific, the seventh side wall 57 and the eighth side wall 58 have second through holes 66 through which the second axis R2 passes. The second through holes 66 each has a smaller diameter than the outer diameter of the second spherical bodies 65. The second spherical body 65 is welded to the seventh side wall 57 while being partially inserted into the corresponding second through hole 66 from the inner peripheral side of the seventh side wall 57. Also, the second spherical body 65 is welded to the eighth side wall 58 while being partially inserted into the corresponding second through hole 66 from the inner peripheral side of the eight-side wall 58. The second spherical bodies 65 and the case 43 are welded from the outer peripheral side of the case 43 through the second through holes 66.

Besides the second spherical bodies 65, metal shafts may be used. In such a case, each shaft can extend through the corresponding second through hole 66 along the second axis R2. The shafts protrude from the seventh side wall 57 and the eighth side wall 58 toward the inner peripheral side along the second axis R2. The end portion of each shaft on the outer peripheral side has a hemispherical shape.

Gimbal Mechanism

Figure 7:
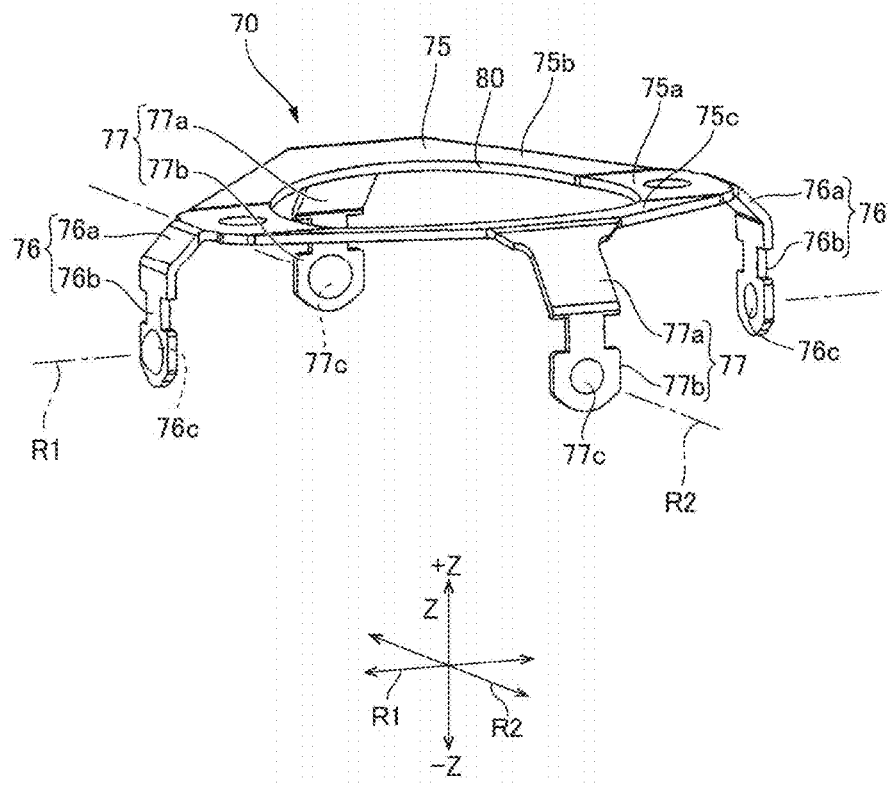
FIG. 7 is a perspective view of a gimbal frame.
Figure 8:
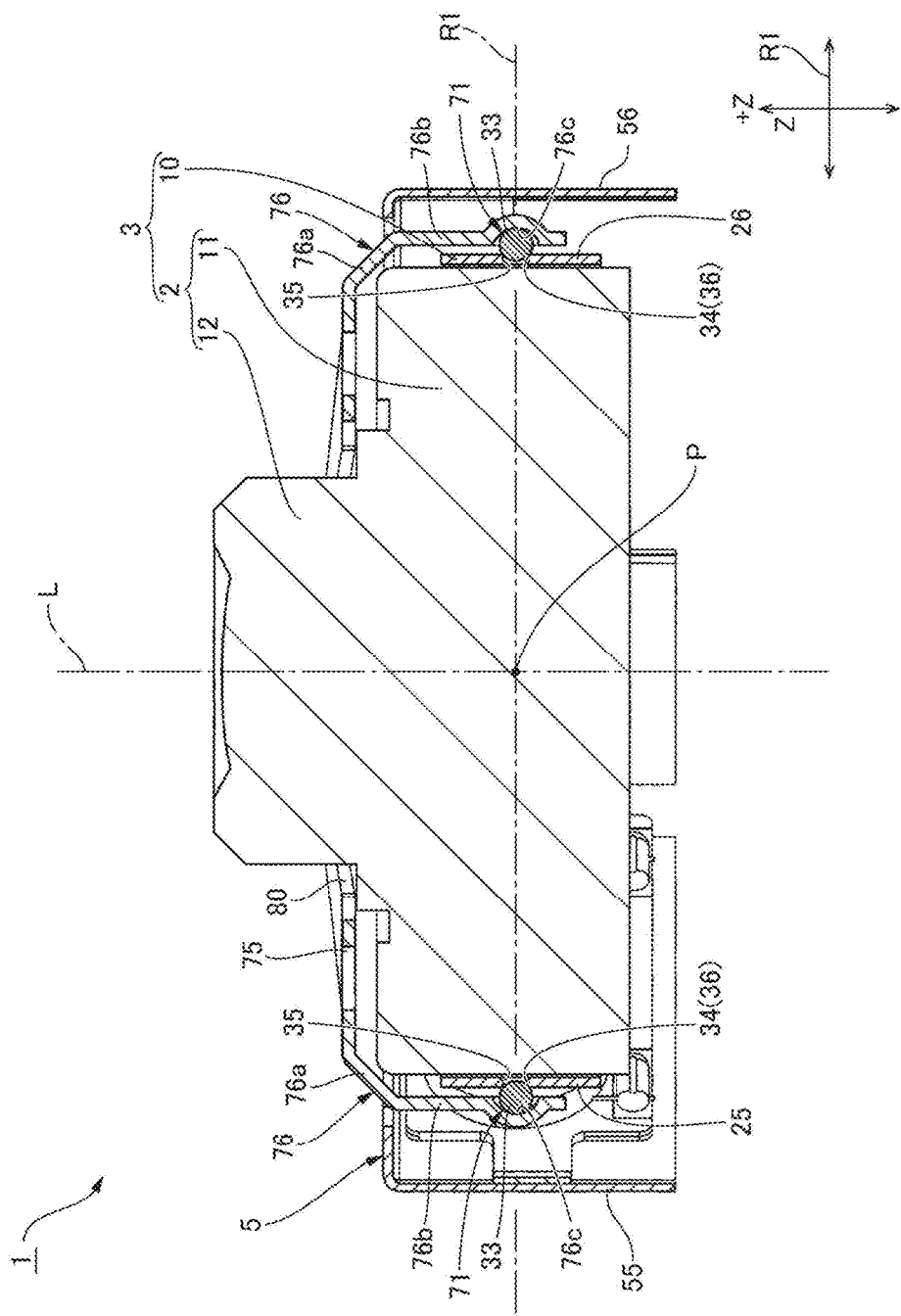
FIG. 8 is a cross-sectional view of the optical module having the image shake correction function taken along line A-A in FIG. 2.
Figure 9:
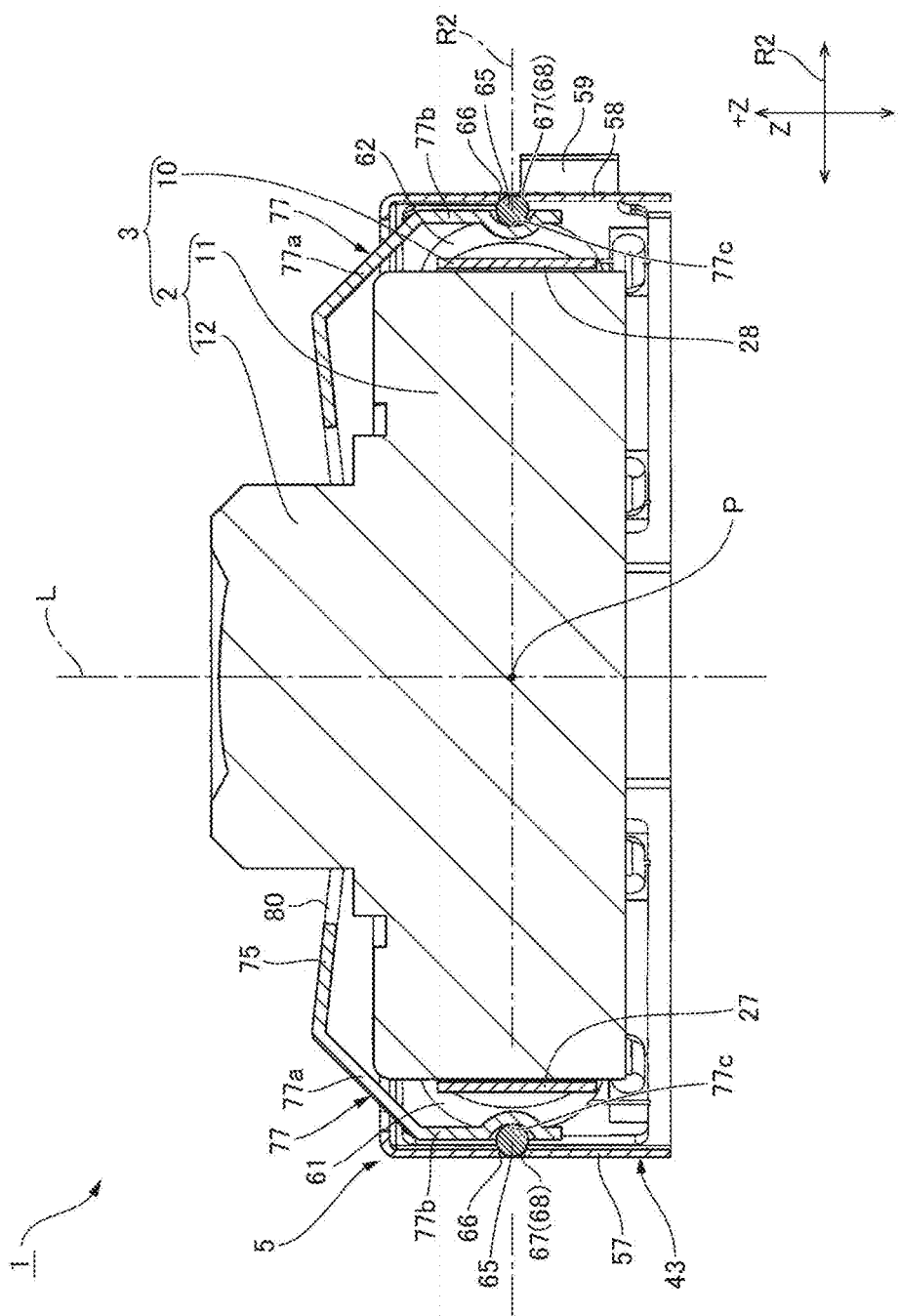
FIG. 9 is a cross-sectional view of the optical module having the image shake correction function taken along line B-B in FIG. 2.

FIG. 7 is a perspective view of a gimbal frame. FIG. 8 is a cross-sectional view of the optical module 1 having an image shake correction function taken along line A-A in FIG. 2. FIG. 9 is a cross-sectional view of the optical module 1 having the image shake correction function taken along line B-B in FIG. 2. The gimbal mechanism 4 includes a gimbal frame 70, a first coupling mechanism 71 that couples the gimbal frame 70 and the holder 8 in a rotatable manner around the first axis R1, and a second coupling mechanism 72 that couples the gimbal frame 70 and the case 43 in a rotatable manner around the second axis R2.

Gimbal Frame

The gimbal frame 70 in composed of a metal flat spring. The gimbal frame 70 has a gimbal frame body 75 disposed on the +Z direction side of the holder 8, a pair of the first gimbal frame extensions 76 projecting from the gimbal frame body 75 in both directions along the first axis R1 and extending in the −Z direction, and a pair of the second gimbal frame extensions 77 projecting from the gimbal frame body 75 in both directions along the second axis R2 and extending in the −Z direction.

The gimbal frame body 75 has a substantially rectangular central plate 75a extending in the first axis R1 direction, a first tilting plate 75b tilting from the central plate 75a in the −Y direction along the second axis R2 and the +Z direction, and a second tilting plate 75c tilting from the central plate 75a in the +Y direction along the second axis R2 and the +Z direction. The gimbal frame body 75 has an opening 80 penetrating the center of the gimbal frame body 75 in the Z axis direction. The end of the camera module 2 on the +Z direction side is inserted to the opening 80.

The pair of the first gimbal frame extensions 76 each includes a first-gimbal-frame-extension first extension portion 76a that tilts in the −Z direction away from the gimbal frame body 75 in the first axis R1 direction, and a firstgimbal-frame-extension second extension portion 76b that extends in the −Z direction from the −Z direction edge of the first-gimbal-frame-extension first extension portion 76a along the outer periphery of the holder 8 in the −Z direction. Each first-gimbal-frame-extension second extension portion 76b has a first concave curved surface 76c on the inner peripheral surface adjacent to the holder 8. The first concave curved surface 76c is depressed toward the outer peripheral side. As illustrated in FIG. 8, one of the first-gimbal-frame-extension second extension portions 76b extends across the fifth side plate 25 of the holder 8 and the fifth side wall 55 of the case 43 in the Z axis direction. As illustrated in FIG. 8, the other of the first-gimbal-frame-extension second extension portions 76b extends across the sixth side plate 26 of the holder 8 and the sixth side wall 56 of the case 43 in the Z axis direction.

As illustrated in FIG. 7, the pair of the second gimbal frame extensions 77 each includes a second-gimbal-frame-extension first extension portion 77a that tilts in the −Z direction away from the gimbal frame body 75 in the second axis R2 direction, and a second-gimbal-frame-extension second extension portion 77b that extends in the −Z direction from the −Z direction edge of the second-gimbal-frame-extension first extension portion 77a along the outer periphery of the holder 8 in the −Z direction.

In specific, the second-gimbal-frame-extension first extension portion 77a of one of the second limb frame extension portion 77 disposed on the −Y direction side protrudes in the second axis R2 direction from the outer peripheral edge of the first tilting plate 75b. As illustrated in FIG. 9, the second-gimbal-frame-extension second extension portion 77b of the one of the second gimbal frame extensions 77 extends in the Z axis direction across the seventh side plate 27 of the holder 8 and the seventh side wall 57 of the case 43. The second-gimbal-frame-extension first extension portion 77a of the other of the second gimbal frame extensions 77 disposed on the +Y direction side protrudes in the second axis R2 direction from the outer peripheral edge of the second tilting plate 75c. The second-gimbal-frame-extension second extension portion 77b of the other of the second gimbal frame extensions 77 extends in the Z axis direction across the eighth side plate 28 of the holder 8 and the eighth side wall 58 of the case 43. The second-gimbal-frame-extension second extension portions 77b each have a second concave curved surface 77c disposed in the area overlapping with the second axis R2 of the outer peripheral side of the second-gimbal-frame-extension second extension portion 77b. The second concave curved surface 77c depresses toward the outer peripheral side.

First Coupling Mechanism and Second Coupling Mechanism

As illustrated in FIG. 8, in a first coupling mechanism 71, the first spherical bodies 33 fixed to the holder 8 (the fifth side plate 25 and the sixth side plate 26) of the movable body 3 are disposed in the first concave curved surfaces 76c of the first-gimbal-frame-extension second extension portions 76b of the pair of the first gimbal frame extensions 76. In this example, the first spherical bodies 33 and the first concave curved curved surfaces 76c are in point contact.

The first coupling mechanism 71 causes the movable body 3 to be rotatably supported by the gimbal frame 70. Since the gimbal frame 70 is a flat spring, the first gimbal frame extensions 76 are elastically deformable in the first axis R1 direction. Thus, when the first spherical bodies 33 and the first concave curved curved surfaces 76c are brought into contact with each other, the first gimbal frame extending portions 76 are bent to the outer peripheral side. As a result, the first concave curved surfaces 76c of the first gimbal frame extensions 76 are pressed against the first spherical bodies 33 by the elastic return force of the first gimbal extension 76 in the direction toward the inner periphery.

As illustrated in FIG. 9, in the second coupling mechanism 72, the second spherical bodies 65 fixed to the case 43 (the seventh side wall 57 and the eighth side wall 58) of the fixed body 5 are disposed in the second concave curved surfaces 77c of the second-gimbal-frame-extension second extension portions 77b of the pair of the second gimbal frame extensions 77. In this example, the second spherical bodies 65 and the second concave curved surfaces 77c are in point contact.

The second coupling mechanism 72 causes the movable body 3 coupled with the gimbal frame 70 to be rotatable around the second axis R2 together with the gimbal frame 70. Since the gimbal frame 70 is a flat spring, the second gimbal frame extensions 77 are elastically deformable in the second axis R2 direction. Thus, when the second spherical bodies 65 and the second concave curved surfaces 77c are brought into contact with each other, the second gimbal frame extensions 77 are bent to the inner peripheral side. As a result, the second concave curved surfaces 77c of the second gimbal frame extensions 77 are pressed against the second spherical bodies 65 by the elastic return force of the second gimbal frame extensions 77 in the direction toward the outer periphery.

Shake-Correction Magnetic Drive Mechanism

In a state in which the movable body 3 is supported by the fixed body 5 via the gimbal mechanism 4, as illustrated in FIG. 9, the pair of the first magnets 31 held by the holder 8 and the pair of the first shake-correction coils 61 fixed to the case 43 face each other in the X axis direction with a gap disposed therebetween. That is, as illustrated in FIG. 2, the first magnet 31 held on the first side plate 21 of the holder 8 and the first shake-correction coil 61 fixed to the first side wall 51 of the case 43 face each other in the X direction with a gap disposed therebetween. The first magnet 31 held on the second side plate 22 of the holder 8 and the first shake-correction coil 61 fixed to the second side wall 52 of the case 43 face each other in the X direction with a gap disposed therebetween. The pair of the first magnets 31 and the pair of the first shake-correction coils 61 constitute a first shake-correction magnetic drive mechanism 81 that generates a propulsive force that rotates the movable body 3 around the Y axis.

In a state in which the movable body 3 is supported by the fixed body 5 via the gimbal mechanism 4, the pair of the second magnets 32 held by the holder 8 and the pair of the second shake-correction coils 62 fixed to the case 43 face each other in the Y axis direction with a gap disposed therebetween. That is, the second magnet 32 fixed to the third side wall 53 of the holder 8 and the second shake-correction coil 62 fixed to the third side wall 53 of the case 43 face each other in the Y direction with a gap disposed therebetween. The second magnet 32 fixed to the fourth side wall 54 of the holder 8 and the second shake-correction coil 62 fixed to the fourth side wall 54 of the case 43 face each other in the Y direction with a gap disposed therebetween. The pair of the second magnets 32 and the pair of the second shake-correction coils 62 constitute a second shake-correction magnetic drive mechanism 82 that generates a propulsive force that rotates the movable body 3 around the X axis.

The first shake-correction magnetic drive mechanism 81 and the second shake-correction magnetic drive mechanism 82 constitute the shake-correction magnetic drive mechanism 6 that rotates the movable body 3 around the first axis R1 and the second axis R2. Thus, the shake-correction magnetic drive mechanism 6 includes the pair of the first shake-correction coils 61 of the first shake-correction magnetic drive mechanism 81 and the pair of the second shake-correction coils 62 of the second shake-correction magnetic drive mechanism 82, to serve as shake-correction coils. The shake-correction magnetic drive mechanism 6 further includes the pair of the first magnets 31 of the first shake-correction magnetic drive mechanism 81 and the pair of the second magnets 32 of the second shake-correction magnetic drive mechanism 82, to serve as shake-correction magnets that face the shake-correction coils in the radial direction.

The first shake-correction magnetic drive mechanism 81 is disposed between the first axis R1 and the second axis R2 along the peripheral direction. The second shake-correction magnetic drive mechanism 82 is disposed between the first axis R1 and the second axis R2 on the opposite side of the first shake-correction magnetic drive mechanism 81 with respect to the first axis R1 in the peripheral direction. The shake-correction magnetic drive mechanism 6 combines the rotation around the Y axis of the movable body 3 by the first shake-correction magnetic drive mechanism 81 and the rotation around the X axis of the movable body 3 by the second shake-correction magnetic drive mechanism 82, to rotate the movable body 3 around the first axis R1 and the second axis R2.

In this exemplified embodiment, the pair of the first magnets 31 and the pair of the second magnets 32, which are shake-correction magnets, of the shake-correction magnetic drive mechanism 6 also serve as the lens-moving magnets 11 of the lens-moving magnetic drive mechanism 9. The lens-moving coils 10, the shake-correction magnets (the first magnets 31 and the second magnets 32) also serving as lens-moving magnets, and the shake-correction coils (the first shake-correction coils 61 and the second shake-correction coils 62) are disposed radially outward of the triaxial intersection P of the optical axis, the first axis R1, and the second axis R2.

In a state in which the movable body 3 is supported by the fixed body 5 via the gimbal mechanism 4, the first magnetic member 91 of the fixed body 5 is disposed on the opposite side of the movable body 3 with respect to the first shake correction coil 61 in the radial direction of the optical axis L. The first magnetic member 91 is overlaid by the corresponding first magnet 31 in view from a direction perpendicular to the optical axis L. The second magnetic member 92 of the fixed body 5 is disposed on the opposite side of the movable body 3 with respect to the corresponding second shake-correction coil 62 in the radial direction of the optical axis L. The second magnetic member 92 is overlaid by the corresponding second magnet 32 in view from a direction perpendicular to the optical axis L.

The first magnetic member 91 and the corresponding first magnet 31 constitute a magnetic spring that returns the movable body 3 to a reference rotation position in the direction of rotation around the Y axis. The second magnetic member 92 and the corresponding second magnet 32 constitute a magnetic spring that returns the movable body 3 to a reference rotation position in the direction of rotation around the X axis.

That is, when power is not fed to the shake-correction magnets (the first magnets 31 and the second magnets 32), the movable body 3 is positioned at the reference rotation position around the triaxial intersection P by the pulling force applied by the first magnetic member 91 to the first magnets 31 and the pulling force applied by the second magnetic member 92 to the second magnets 32. In a reference orientation of the movable body 3 positioned at the reference rotation position, the first Hall device 85 faces the magnetization polarization line 31a of the corresponding first magnet 31. The second Hall device 86 faces the magnetization polarization line 32a of the corresponding second magnet 32. When the movable body 3 rotates around the Y axis from the rotation reference position, the first Hall device 85 provides an output corresponding to the rotation angle of the movable body 3 around the Y axis. When the movable body 3 rotates around the X axis from the rotation reference position, the second Hall device 86 provides an output corresponding to the rotation angle of the movable body 3 around the X axis.

According to the above-described exemplified embodiment, the movable body 3 is supported by the gimbal mechanism 4 so as to be rotatable around the first axis R1 and the second axis R2. The lens-moving coils 10 of the movable body 3 and the shake-correction magnets (the first magnets 31 and the second magnets 32) are disposed radially outward from the triaxial intersection P of the optical axis L, the first axis R1, and the second axis R2. The triaxial intersection P is a movably-shifting center point of the movable body 3 tilting relative to the optical axis L. Thus, the movably-shifting center point of the movable body 3 is disposed at an inward position on the movable body 3 in the Z axis direction. This eliminates the need to dispose a movably-shiftable support member 3 at an outward position of the movable body 3 in the Z axis direction. Thus, the optical module 1 having an image shake correction function can be downsized in the Z axis direction.

The shake-correction magnets (the first magnets 31 and the second magnets 32) of the shake-correction magnetic drive mechanism 6 that rotates the movable body 3 also serve as the lens-moving magnets 11 of the lens-moving magnetic drive mechanism 9 that shifts the lens 13. The lens-moving coils 10, the shake-correction magnets (the first magnets 31 and the second magnets 32), and the shake-correction coils (the first shake-correction coils 61 and the second shake-correction coils 62) are disposed in this order from the triaxial intersection P radially outward along the optical axis L. Thus, in this configuration, the optical module 1 having an image shake correction function can be downsized in the radial direction along the optical axis L, in comparison with a configuration in which the shake-correction magnets (the first magnets 31 and the second magnets 32) and the lens-moving magnets 11 are provided separately, and the shake-correction magnets (the first magnets 31 and the second magnets 32) are disposed radially outward of the lens-moving magnets 11.

The movably-shifting center point (the triaxial intersection P) of the movable body 3 is disposed at an inward position on the movable body 3 along the Z axis direction. Thus, the space needed for the displacement of the movable body 3 when the movable body 3 is to be movably shifted by a predetermined angle relative to the optical axis L can be reduced in comparison with the case where the movably-shifting center point of the movable body 3 is disposed outward of the movable body 3. In this way, the movable body 3 and the frame 41 of the fixed body 5 can be brought close together along the radial direction of the optical axis L. Thus, the optical module 1 having an image shake correction function can be downsized in a radial direction perpendicular to the optical axis L. The closely disposed movable body 3 and the frame 41 of the fixed body 5 prevents the shake-correction coils (the first shake-correction coils 61 and the second shake-correction coils 62) fixed to the frame 41 and the shake-correction magnets (the first magnets 31 and the second magnets 32) from moving apart from each other, even when the shake-correction magnets (the first magnets 31 and the second magnets 32) also serving as the lens-moving magnets 11 move close to the lens-moving coils 10 in the radial direction.

The holder 8 includes the first magnet holding hole 21a, the second magnet holding hole 22a, the third magnet holding hole 23a, and the fourth magnet holding hole 24a, all penetrating the holder 8 in a direction perpendicular to the optical axis L. The pair of the first magnets 31 and the pair of the second magnets 32 of the shake-correction magnets are each passed through the first magnet holding hole 21a, the second magnet holding hole 22a, the third magnet holding hole 23a, and the fourth magnet holding hole 24a. Thus, the inner peripheral surfaces of the shake-correction magnets (the first magnets 31 and the second magnets 32) held by the holder 8 face the lens-moving coils 10, and the outer peripheral surfaces face the shake-correction coils (the first shake-correction coils 61 and the second shake-correction coils 62).

The first coupling mechanism 71 includes the pair of the first spherical bodies 33 that are fixed at the corners of the holder 8 along the first axis R1 and protrude from the holder 8 to the outer peripheral side along the first axis R1, and the pair of the first concave curved surfaces 76c that are disposed on the gimbal frame and in contact with the tips of the pair of the first spherical bodies 33. The second coupling mechanism 72 includes the pair of the second spherical bodies 65 that are fixed at the corners of the frame 41 along the second axis R2 and protrude from the frame 41 to the inner peripheral side along the second axis R2, and the pair of the second concave curved surfaces 77c that are disposed on the gimbal frame and in contact with the tips of the pair of the second spherical bodies 65. Thus, the movable body 3 is supported by the gimbal mechanism 4 so as to be rotatable around the first axis R1 and the second axis R2.

The gimbal frame 70 includes the gimbal frame body 75 having an opening 80 through which the lens module 7 passes, the pair of the first gimbal frame extensions 76 protruding from both sides of the gimbal frame body 75 in the first axis R1 direction and extending along the Z axis direction between the frame 41 and the holder 8, and the pair of the second gimbal frame extensions 77 protruding from both sides of the gimbal frame 70 in the second axis R2 direction and extending along the Z axis direction between the frame 41 and the holder 8. The first gimbal frame extensions 76 have the first concave curved surfaces 76c. The second gimbal frame extensions 77 have the second concave curved surfaces 77c. Thus, the first coupling mechanism 71 and the second coupling mechanism 72 can be disposed radially outward of the movable body 3. Thus, the triaxial intersection P of the optical axis L, the first axis R1, and the second axis R2 can be disposed at an inward position on the movable body 3 in the Z axis direction.

This exemplified embodiment further includes the lens-moving coils 10 or the first lens-moving coils 10a and the second lens-moving coils 10b that are wound around the optical axis L along the outer peripheral surface of the lens module 7, and face the pair of the first magnets 31 and the pair of the second magnets 32. Thus, the power fed to the first lens-moving coils 10a and the second lens-moving coils 10b moves the lens module 7 along the Z axis direction.

Modification

Figure 10:
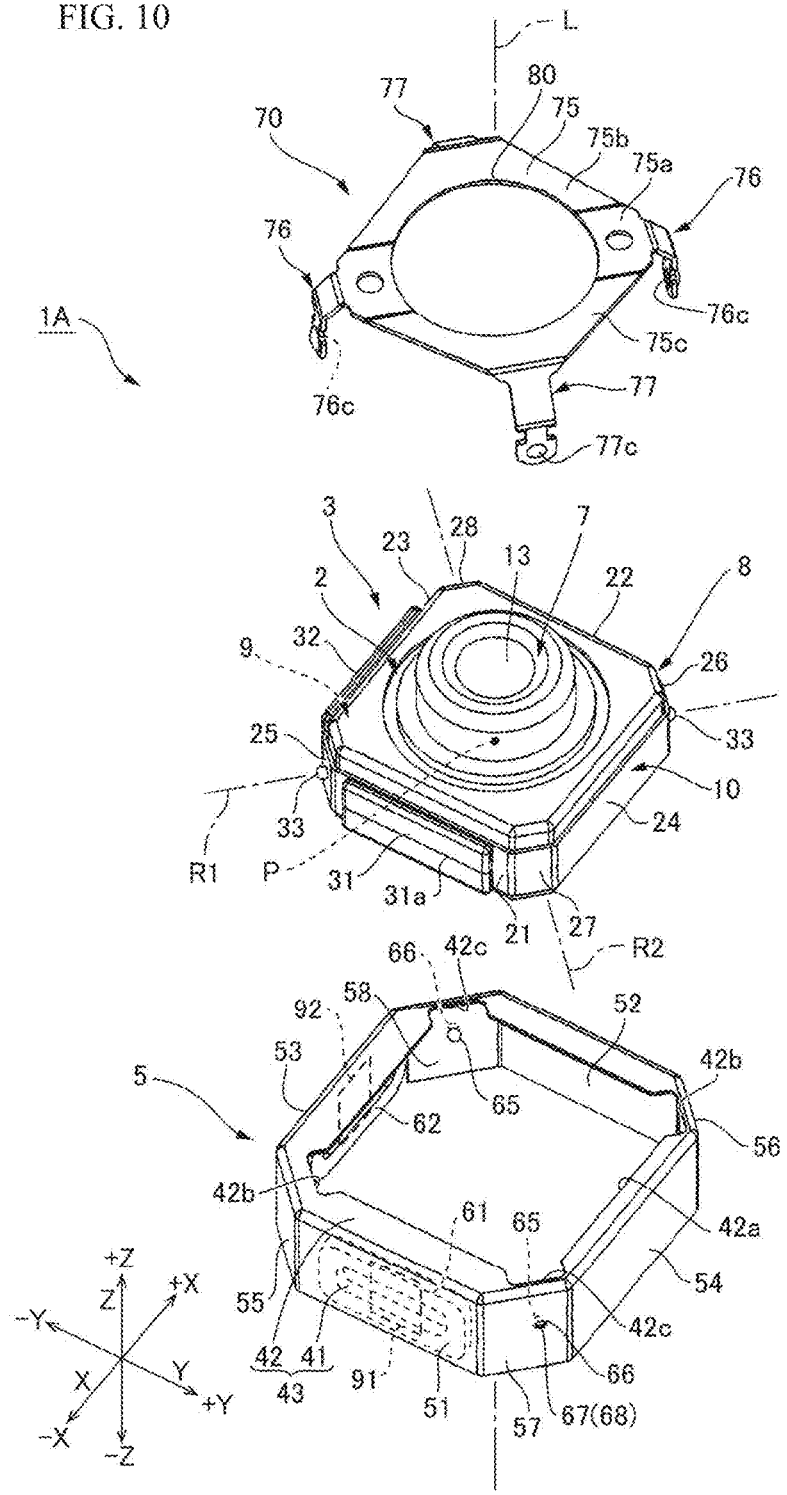
FIG. 10 is an exploded perspective view of an optical module having an image shake correction function according to a modification.
Figure 11:
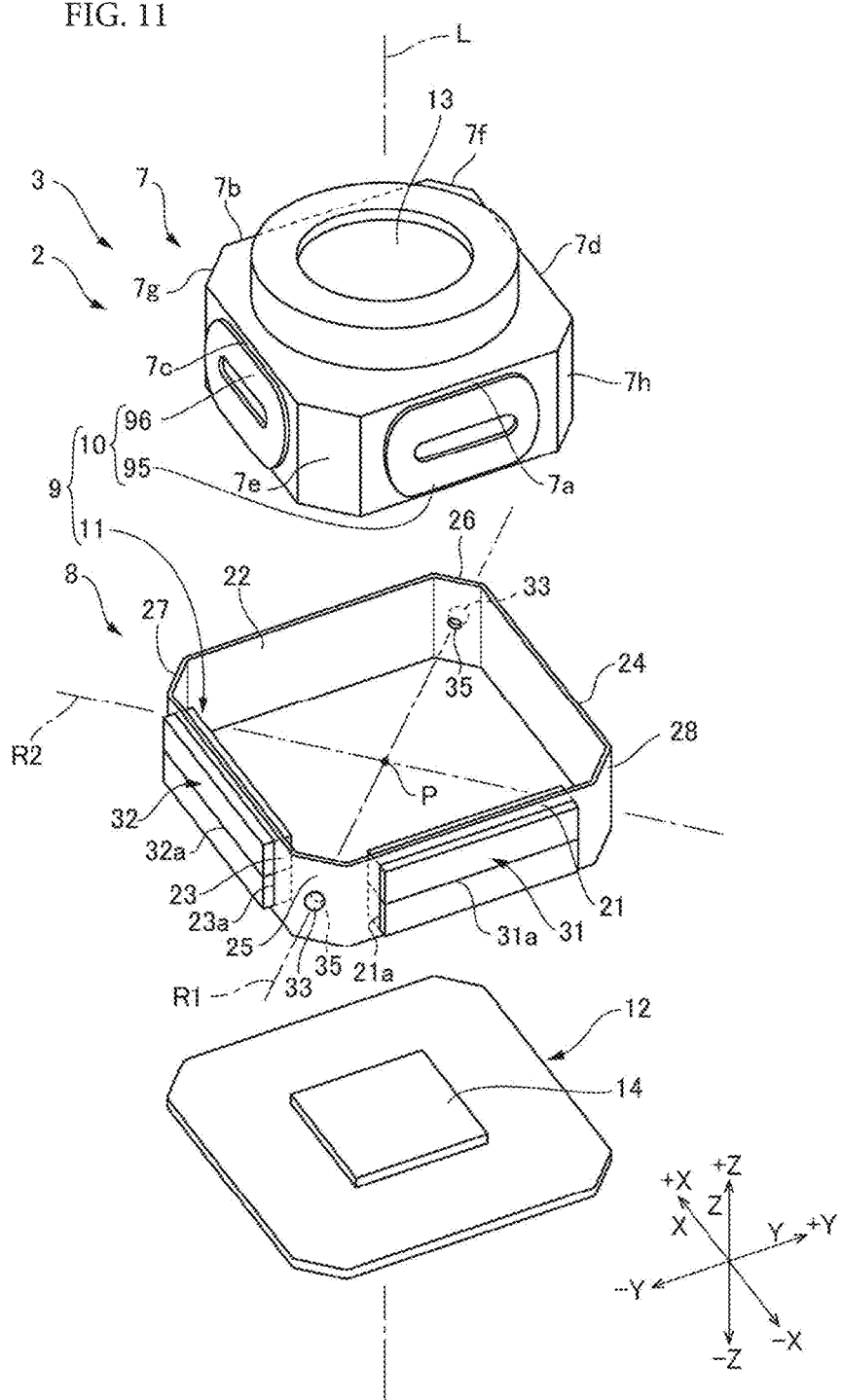
FIG. 11 is an exploded perspective view of a movable body of the optical module having the image shake correction function illustrated in FIG. 10.

FIG. 10 is an exploded perspective view of an optical module 1A having an image shake correction function according to a modification. FIG. 11 is an exploded perspective view of a movable body 3 of the optical module 1A having an image shake correction function of FIG. 10. Note that the optical module 1A having an image shake correction function according to the modification has a configuration corresponding to that of the optical module 1 having an image shake correction function. Thus, the corresponding components are denoted by the same reference numerals and descriptions thereof are omitted.

As illustrated in FIG. 10, in the optical module 1A having the image shake correction function of this modification, the shake-correction magnets of the shake-correction magnetic drive mechanism 6 are a first magnet 31 fixed to first side plate 21 of the holder 8 of the movable body 3, and a second magnet 32 fixed to a third side plate 23. The shake-correction coils of the shake-correction magnetic drive mechanism 6 are a first shake-correction coil 61 fixed to the first side wall 51 of the frame 41 of the fixed body 5 and facing the first magnet 31 in the X axis direction, and a second shake-correction coil 62 fixed to the third side wall 53 of the frame 41 of the fixed body 5 and facing the second magnet 32 in the Y axis direction. That is, the configuration of the shake-correction magnets and the shake-correction coils of the shake-correction magnetic drive mechanism 6 of the optical module 1A having the image shake correction function according to this modification is modified from that of the above-described optical module 1 having an image shake correction function.

In the optical module 1A having an image shake correction function, the configuration of the shake-correction magnets of the shake-correction magnetic drive mechanism 6 also serving as the lens-moving magnets 11 of the lens-moving magnetic drive mechanism 9 is modified. Thus, in accordance with this modification, the configuration of the lens-moving coils 10 of the lens-moving magnetic drive mechanism 9 is also modified.

That is, the lens-moving coils 10 of this modification include a first lens-moving coil 95 fixed to a first wall 7a of the lens module 7 of the movable body 3 and a second lens-moving coil 96 fixed to a third wall 7c. The first lens-moving coil 95 has its center hole oriented in the X axis direction, which is a radial direction of the optical axis L. The second lens-moving coil 96 has its center hole oriented in the Y axis direction, which is a radial direction of the optical axis L. Thus, in a state in which the lens module 7 is disposed on the inner periphery of the holder 8, the first lens-moving coil 95 faces the first magnet 31 fixed to the holder 8 with a slight gap disposed therebetween in the X axis direction. The second lens-moving coil 96 faces the second magnet 32 fixed to the holder 8 with a slight gap disposed therebetween in the X axis direction.

In this modification, also, the lens module 7 moves in the Z axis direction by feeding power to the lens-moving coils 10 (the first lens-moving coil 95 and the second lens-moving coil 96). As a result, the lens 13 shifts in the optical axis L direction.

According to this modification, the same advantageous effects as those of the above optical module 1 having the image shake correction function can be achieved.

In this modification, the number of shake-correction magnets and shake-correction coils of the shake-correction magnetic drive mechanism 6 can be reduced.

In the optical module 1A having the image shake correction function, the lens-moving magnetic drive mechanism 9 resides unevenly along the peripheral direction around the optical axis. Thus, when the lens module 7 moves in the Z axis direction by feeding power to the lens-moving coils 10 (the first lens-moving coil 95 and the second lens-moving coil 96), there is a possibility of the lens module 7 tilting relative to the optical axis L. Thus, a guide mechanism may further be provided on the movable body 3 to guide the lens module 7 in the optical axis L direction so as to maintain the lens module 7 while the lens module 7 shifts in the optical axis direction.

Note that, one of the first lens-moving coil 95 and the second lens-moving coil 96 of the lens-moving coils 10 of the optical module 1A having the image shake correction function may be omitted. In such a case, also, the lens module 7 can shift in the Z axis direction by feeding power to the lens-moving coils 10. Thus, the lens 13 can shift in the optical axis L direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical module having an image shake correction function, comprising:
    a movable body comprising a lens;
    a gimbal mechanism that supports the movable body in a rotatable manner around a first axis intersecting an optical axis of the lens and a second axis intersecting the optical axis and the first axis;
    a fixed body that supports the movable body via the gimbal mechanism; and
    a shake-correction magnetic drive mechanism that rotates the movable body around the first axis and the second axis,
    wherein the movable body comprises:
        a lens module comprising the lens,
        a holder that has a frame shape and supports the lens module on the outer peripheral side of the lens module so that the lens module is movable in the optical axis direction, and
        a lens-moving magnetic drive mechanism that moves the lens module along the optical axis direction,
    wherein the gimbal mechanism comprises:
        a gimbal frame,
        a first coupling mechanism that couples the holder and the gimbal frame in a rotatable manner around the first axis, and
        a second coupling mechanism that couples the gimbal frame and the fixed body in a rotatable manner around the second axis,
    the fixed body comprising a frame that surrounds the holder and the gimbal frame from an outer peripheral side,
        wherein the fixed body comprises a frame that surrounds the holder and the gimbal frame from an outer peripheral side,
        wherein the shake-correction magnetic drive mechanism comprises:
            a shake-correction magnet that is fixed to the holder; and
            a shake-correction coil that is fixed to the frame and faces the shake-correction magnet,
        wherein the lens-moving magnetic drive mechanism comprises:
            a lens-moving coil that is fixed to the lens module; and
            a lens-moving magnet that is fixed to the holder and faces the lens-moving coil,
        wherein the shake-correction magnet also serves as the lens-moving magnet, and
        wherein the lens-moving coil, the shake-correction magnet, and the shake-correction coil are disposed in this order along a radially outward direction of the optical axis from a triaxial intersection of the optical axis, the first axis, and the second axis.

2. The optical module having the image shake correction function according to claim 1, wherein the first axis is perpendicular to the optical axis, and the second axis is perpendicular to the optical axis and the first axis.

3. The optical module having an image shake correction function according to claim 1, wherein,
    the holder has a magnet holding hole penetrating the holder in a direction intersecting the optical axis, and
    the shake-correction magnet passes through the magnet holding hole and faces the lens-moving coil and the shake-correction coil.

4. The optical module having the image shake correction function according to claim 3, wherein,
    the first coupling mechanism comprises:
        a pair of first support members that are fixed at corners of the holder along the first axis and protrude from the holder to the outer peripheral side along the first axis, and
        a pair of first concave curved surfaces that are disposed on the gimbal frame and in contact with tips of the pair of the first support members, and
    the second coupling mechanism comprises:
        a pair of second support members that are fixed at corners of the frame along the second axis and protrude from the frame to the inner peripheral side along the second axis, and
        a pair of second concave curved surfaces that are disposed on the gimbal frame and in contact with tips of the pair of the second support members.

5. The optical module having the image shake correction function according to claim 4, wherein,
    the gimbal frame comprises:
        a gimbal frame body that has an opening through which the lens module passes;
        a pair of first gimbal frame extensions that protrude from both sides of the gimbal frame body in the first axis direction and extend along the optical axis direction between the frame and the holder; and
        a pair of second gimbal frame extensions that protrude from both sides of the gimbal frame body in the second axis direction and extend along the optical axis direction between the frame and the holder, and
    wherein the first concave curved surfaces are disposed on the pair of the first gimbal frame extensions, and
    the second concave curved surfaces are disposed on the pair of the second gimbal frame extensions.

6. The optical module having the image shake correction function according to claim 1, wherein,
    the first coupling mechanism comprises:
        a pair of first support members that are fixed at corners of the holder along the first axis and protrude from the holder to the outer peripheral side along the first axis, and
        a pair of first concave curved surfaces that are disposed on the gimbal frame and in contact with tips of the pair of the first support members, and
    wherein the second coupling mechanism comprises:

a pair of second support members that are fixed at corners of the frame along the second axis and protrude from the frame to the inner peripheral side along the second axis, and pair of second concave curved surfaces that are disposed on the gimbal frame and in contact with tips of the pair of the second support members.

7. The optical module having the image shake correction function according to claim 6, wherein, the gimbal frame comprises:
a gimbal frame body that has an opening through which the lens module passes;
a pair of first gimbal frame extensions that protrude from both sides of the gimbal frame body in the first axis direction and extend along the optical axis direction between the frame and the holder; and
a pair of second gimbal frame extensions that protrude from both sides of the gimbal frame body in the second axis direction and extend along the optical axis direction between the frame and the holder, and wherein the first concave curved surfaces are disposed on the pair of the first gimbal frame extensions, and the second concave curved surfaces are disposed on the pair of the second gimbal frame extensions.

8. The optical module having the image shake correction function according to claim 1, wherein, the shake-correction magnetic drive mechanism comprises:
a first shake-correction magnetic drive mechanism disposed between the first axis and the second axis along a peripheral direction around the optical axis; and
a second shake-correction magnetic drive mechanism disposed between the first axis and the second axis from the opposite side of the first shake-correction magnetic drive mechanism relative to the first axis in the peripheral direction, wherein the shake-correction magnet comprises:
a first magnet of the first shake-correction magnetic drive mechanism; and
a second magnet of the second shake-correction magnetic drive mechanism, and wherein the lens-moving coil comprises:
a first lens-moving coil that is wound around the optical axis along the outer peripheral surface of the lens module and faces the first magnet and the second magnet; and
a second lens-moving coil that is wound around the optical axis along the outer peripheral surface of the lens module adjacent to the first lens-moving coils in the optical axis direction, and faces the first magnet and the second magnet.

9. The optical module having the image shake correction function according to claim 8, wherein, the shake-correction coil comprises:
a first coil of the first shake-correction magnetic drive mechanism; and
a second coil of the second shake-correction magnetic drive mechanism, and wherein the fixed body comprises:
a first magnetic member that is disposed on the opposite side of the movable body with respect to the first coil in the radial direction of the optical axis; and
a second magnetic member that is disposed on the opposite side of the movable body of the second coil.

10. The optical module having the image shake correction function according to claim 1, wherein, the shake-correction magnetic drive mechanism comprises:
a first shake-correction magnetic drive mechanism disposed between the first axis and the second axis along a peripheral direction around the optical axis; and
a second shake-correction magnetic drive mechanism disposed between the first axis and the second axis and disposed adjacent to the first axis and remote from the first shake-correction magnetic drive mechanism in the peripheral direction, wherein the shake-correction magnet comprises:
a first magnet of the first shake-correction magnetic drive mechanism; and
a second magnet of the second shake-correction magnetic drive mechanism, and wherein the lens-moving coil comprises:
a first lens-moving coil that is fixed to the outer peripheral surface of the lens module with a center hole of the first lens-moving coil oriented in the radial direction of the optical axis, and faces the first magnet; and
a second lens-moving coil that is fixed to the outer peripheral surface of the lens module with a center hole of the second lens-moving coil oriented in the radial direction of the optical axis, and faces the second magnet.

11. The optical module having the image shake correction function according to claim 10, wherein, the shake-correction coil comprises:
a first coil of the first shake-correction magnetic drive mechanism; and
a second coil of the second shake-correction magnetic drive mechanism, and the fixed body comprises:
a first magnetic member that is disposed on the opposite side of the movable body with respect to the first coil in the radial direction of the optical axis; and
a second magnetic member that is disposed on the opposite side of the movable body of the second coil.

12. The optical module having the image shake correction function according to claim 1, wherein, the shake-correction magnetic drive mechanism comprises:
a first shake-correction magnetic drive mechanism that is disposed between the first axis and the second axis along a peripheral direction around the optical axis; and
a second shake-correction magnetic drive mechanism that is disposed between the first axis and the second axis on the opposite side of the first shake-correction magnetic drive mechanism with respect to the first axis in the peripheral direction, wherein the shake-correction magnet comprises:
a first magnet of the first shake-correction magnetic drive mechanism; and
a second magnet of the second shake-correction magnetic drive mechanism, and wherein the lens-moving coil is fixed to the outer peripheral surface of the lens module with a center hole being oriented in the radial direction of the optical axis, and faces one of the first magnet and the second magnet.

13. The optical module having an image shake correction function according to claim 12, wherein, the shake-correction coil comprises:
a first coil of the first shake-correction magnetic drive mechanism; and a second coil of the second shake-correction magnetic drive mechanism, and wherein the fixed body comprises:
a first magnetic member that is disposed on the opposite side of the movable body with respect to the first coil in the radial direction of the optical axis; and
a second magnetic member that is disposed on the opposite side of the movable body of the second coil.

* * * * *